United States Patent
Xu et al.

(10) Patent No.: US 11,815,910 B2
(45) Date of Patent: Nov. 14, 2023

(54) METHOD, APPARATUS, MEDIUM, AND DEVICE FOR VEHICLE AUTOMATIC NAVIGATION CONTROL

(71) Applicant: Beijing Tusen Zhitu Technology Co., Ltd., Beijing (CN)

(72) Inventors: Yong Xu, Beijing (CN); Wenrui Li, Beijing (CN); Qingxin Bi, Beijing (CN); Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 66 days.

(21) Appl. No.: 17/211,699

(22) Filed: Mar. 24, 2021

(65) Prior Publication Data

US 2021/0303001 A1    Sep. 30, 2021

(30) Foreign Application Priority Data

Mar. 24, 2020  (CN) .......................... 202010213783.7

(51) Int. Cl.
    *G05D 1/02*  (2020.01)
    *G05D 1/00*  (2006.01)
    *H04L 12/40* (2006.01)

(52) U.S. Cl.
    CPC ......... *G05D 1/0293* (2013.01); *G05D 1/0022* (2013.01); *G05D 1/0217* (2013.01);
    (Continued)

(58) Field of Classification Search
    None
    See application file for complete search history.

(56) References Cited

U.S. PATENT DOCUMENTS 9,940,840 B1 * 4/2018 Schubert ............ G01C 21/3407
2017/0293296 A1 * 10/2017 Stenneth ................ G06Q 20/10
(Continued)

FOREIGN PATENT DOCUMENTS

| CN | 107941228 A | 4/2018 |
| CN | 110033610 A | 7/2019 |

(Continued)

OTHER PUBLICATIONS

Machine translation of WO-2018000386-A1 (Year: 2018).*
(Continued)

*Primary Examiner* — Anne Marie Antonucci
*Assistant Examiner* — Kyle S Park
(74) *Attorney, Agent, or Firm* — Perkins Coie LLP

(57) ABSTRACT

The present disclosure discloses a method, apparatus, medium, and device for vehicle automatic navigation control. With the solutions according to the embodiments of the present disclosure, in a vehicle automatic navigation control process, a first vehicle-mounted server can receive automatic navigation information corresponding to another vehicle, and determine a vehicle-mounted server identifier of a vehicle to form a platoon with a vehicle where the first vehicle-mounted server is located based on automatic navigation information corresponding to the vehicle where the first vehicle-mounted server is located, and transmit a platooning request to a second vehicle-mounted server corresponding to the determined vehicle-mounted server identifier of the vehicle to form the platoon, such that the vehicle where the first vehicle-mounted server is located can form the platoon with another vehicle, and the vehicle where the first vehicle-mounted server is located can be controlled to move as a following vehicle of the other vehicle.

18 Claims, 3 Drawing Sheets

(52) U.S. Cl.
CPC ..... *G05D 1/0223* (2013.01); *H04L 12/40006* (2013.01); *G05D 2201/0213* (2013.01); *H04L 2012/40273* (2013.01)

(56) References Cited

U.S. PATENT DOCUMENTS

| | | | |
|---|---|---|---|
| 2018/0211546 A1* | 7/2018 | Smartt | H04W 4/46 |
| 2019/0025857 A1* | 1/2019 | Luckevich | G01C 22/00 |
| 2019/0171227 A1 | 6/2019 | Sujan et al. | |
| 2019/0220037 A1* | 7/2019 | Vladimerou | G08G 1/22 |
| 2021/0398432 A1* | 12/2021 | Bae | G05D 1/02 |

FOREIGN PATENT DOCUMENTS

| | | | | |
|---|---|---|---|---|
| WO | WO-2018000386 A1 * | 1/2018 | | B60W 30/00 |
| WO | 2019111979 A1 | 6/2019 | | |
| WO | 2020034052 A1 | 2/2020 | | |

OTHER PUBLICATIONS

Gavriliu, Bogdan. European Application No. 21164691.4-1213 Extended European Search Report, dated Aug. 24, 2021, pp. 1-7.
Chinese Patent Office, Second Office Action for CN 202010313783.7, dated Sep. 7, 2022, 12 pages.
Chinese Patent Office, First Office Action for Cn 202010313783.7, dated Apr. 6, 2022, 8 pages.

\* cited by examiner

METHOD, APPARATUS, MEDIUM, AND DEVICE FOR VEHICLE AUTOMATIC NAVIGATION CONTROL

PRIORITY CLAIM

The present disclosure claims priority to Chinese Patent Application No. 202010213783.7, titled "METHOD, APPARATUS, MEDIUM, AND DEVICE FOR VEHICLE AUTOMATIC NAVIGATION CONTROL", filed on Mar. 24, 2020, the content of which is incorporated herein by reference in its entirety.

TECHNICAL FIELD

The present disclosure relates to Internet of Vehicles technology, and more particularly, to a method, apparatus, medium, and device for vehicle automatic navigation control.

BACKGROUND

Vehicles based on automatic navigation technology, when having same starting point and destination, often form a platoon at the starting point. The platoon can be understood as a straight line of one vehicle after another, and can then automatically navigate, in the form of a platoon, from the starting point to the destination where the platoon is disbanded.

When vehicles automatically navigate in the form of a platoon, the air resistance experienced by vehicles in the platoon that are blocked by other vehicles can be reduced, and thus the vehicles experiencing reduced air resistance can have lower fuel consumption.

However, with different starting points and/or destinations, vehicles (or platoons) will move separately even if they have an overlapping segment of driving route, and thus the air resistance experienced by the vehicles cannot be effectively reduced, resulting in suboptimal fuel saving effects for the vehicles.

SUMMARY

The embodiments of the present disclosure provide a method, apparatus, medium, and device for vehicle automatic navigation control, capable of solving the problem associated with suboptimal fuel saving effects for vehicles and allowing expansion of a platoon to satisfy various platooning requirements of the platoon.

A method for vehicle automatic navigation control is provided at a vehicle-mounted server requesting to form a platoon according to the present disclosure. The method includes: receiving, by a first vehicle-mounted server, at least one piece of automatic navigation information each containing a navigation route, a destination, a current location, and a vehicle-mounted server identifier of a corresponding vehicle; determining, based on automatic navigation information corresponding to a vehicle where the first vehicle-mounted server is located and the at least one piece of automatic navigation information, a vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement; transmitting a platooning request to a second vehicle-mounted server corresponding to the determined vehicle-mounted server identifier of the vehicle to form the platoon, the platooning request carrying a vehicle-mounted server identifier corresponding to the first vehicle-mounted server; receiving a platooning response containing location information and driving information, the location information and driving information being fed back from the second vehicle-mounted server receiving the platooning request based on the vehicle-mounted server identifier carried in the platooning request in accordance with a predetermined time length, the driving information containing steering wheel angle information, throttle control amount information, and brake control amount information; and controlling, in accordance with the platooning response received each time, the vehicle where the first vehicle-mounted server is located to move as a following vehicle of the vehicle where the second vehicle-mounted server is located. The vehicle where the first vehicle-mounted server is located has one or more following vehicles, and/or the vehicle where the second vehicle-mounted server is located has one or more following vehicles.

A method for vehicle automatic navigation control is provided at a vehicle-mounted server accepting a request to form a platoon according to the present disclosure. The method includes: receiving, by a second vehicle-mounted server, a platooning request carrying a vehicle-mounted server identifier corresponding to a first vehicle-mounted server, the platooning request being transmitted by the first vehicle-mounted server, after receiving at least one piece of automatic navigation information each containing a navigation route, a destination, a current location, and a vehicle-mounted server identifier of a corresponding vehicle, and determining, based on automatic navigation information corresponding to a vehicle where the first vehicle-mounted server is located and the at least one piece of automatic navigation information, a vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement, to the second vehicle-mounted server corresponding to the determined vehicle-mounted server identifier of the vehicle to form the platoon; determining whether to agree to form the platoon based on the platooning request; and transmitting, when it is determined to agree to form the platoon, location information and driving information of the vehicle where the second vehicle-mounted server is located to the first vehicle-mounted server transmitting the platooning request based on the vehicle-mounted server identifier carried in the platooning request in accordance with a predetermined time length, the driving information containing steering wheel angle information, throttle control amount information, and brake control amount information. The vehicle where the first vehicle-mounted server is located has one or more following vehicles, and/or the vehicle where the second vehicle-mounted server is located has one or more following vehicles.

An apparatus for vehicle automatic navigation control is provided at a vehicle-mounted server requesting to form a platoon according to the present disclosure. The apparatus includes: a receiving module configured to receive at least one piece of automatic navigation information each containing a navigation route, a destination, a current location, and a vehicle-mounted server identifier of a corresponding vehicle, and receive a platooning response containing location information and driving information, the location information and driving information being fed back from a second vehicle-mounted server receiving a platooning request based on a vehicle-mounted server identifier carried in the platooning request in accordance with a predetermined time length, the driving information containing steering wheel angle information, throttle control amount information, and brake control amount information; a determining module configured to determine, based on automatic navigation information corresponding to a vehicle where the first vehicle-mounted server is located and the at least one piece of automatic navigation information, a vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement; a transmitting module configured to transmit the platooning request to the second vehicle-mounted server corresponding to the determined vehicle-mounted server identifier of the vehicle to form the platoon, the platooning request carrying the vehicle-mounted server identifier corresponding to the first vehicle-mounted server; and a control module configured to control, in accordance with the platooning response received each time, the vehicle where the first vehicle-mounted server is located to move as a following vehicle of the vehicle where the second vehicle-mounted server is located. The vehicle where the first vehicle-mounted server is located has one or more following vehicles, and/or the vehicle where the second vehicle-mounted server is located has one or more following vehicles.

An apparatus for vehicle automatic navigation control is provided at a vehicle-mounted server accepting a request to form a platoon according to the present disclosure. The apparatus includes: a receiving module configured to receive, by a second vehicle-mounted server, a platooning request carrying a vehicle-mounted server identifier corresponding to a first vehicle-mounted server, the platooning request being transmitted by the first vehicle-mounted server, after receiving at least one piece of automatic navigation information each containing a navigation route, a destination, a current location, and a vehicle-mounted server identifier of a corresponding vehicle, and determining, based on automatic navigation information corresponding to a vehicle where the first vehicle-mounted server is located and the at least one piece of automatic navigation information, a vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement, to the second vehicle-mounted server corresponding to the determined vehicle-mounted server identifier of the vehicle to form the platoon; a determining module configured to determine whether to agree to form the platoon based on the platooning request; and a transmitting module configured to transmit, when it is determined to agree to form the platoon, location information and driving information of the vehicle where the second vehicle-mounted server is located to the first vehicle-mounted server transmitting the platooning request based on the vehicle-mounted server identifier carried in the platooning request in accordance with a predetermined time length, the driving information containing steering wheel angle information, throttle control amount information, and brake control amount information. The vehicle where the first vehicle-mounted server is located has one or more following vehicles, and/or the vehicle where the second vehicle-mounted server is located has one or more following vehicles.

A non-volatile computer storage medium is also provided according to the present disclosure. The non-volatile computer storage medium stores an executable program which, when executed by a processor, implements the method described above at a vehicle-mounted server requesting to form a platoon.

A device for vehicle automatic navigation control is also provided according to the present disclosure. The apparatus includes a processor, a communication interface, a memory, and a communication bus. The processor, the communication interface, and the memory communicate with each other via the communication bus. The memory is configured to store a computer program, and the processor is configured to implement, when executing the program stored on the memory, the method described above at a vehicle-mounted server requesting to form a platoon.

A non-volatile computer storage medium is also provided according to the present disclosure. The non-volatile computer storage medium stores an executable program which, when executed by a processor, implements the method described above at a vehicle-mounted server accepting a request to form a platoon.

A device for vehicle automatic navigation control is also provided according to the present disclosure. The apparatus includes a processor, a communication interface, a memory, and a communication bus. The processor, the communication interface, and the memory communicate with each other via the communication bus. The memory is configured to store a computer program, and the processor is configured to implement, when executing the program stored on the memory, the method described above at a vehicle-mounted server accepting a request to form a platoon.

With the solutions according to the embodiments of the present disclosure, in a vehicle automatic navigation control process, a first vehicle-mounted server can receive automatic navigation information corresponding to another vehicle, and determine, from the received automatic navigation information, a vehicle-mounted server identifier of a vehicle to form a platoon with a vehicle where the first vehicle-mounted server is located based on automatic navigation information corresponding to the vehicle where the first vehicle-mounted server is located, and transmit a platooning request to a second vehicle-mounted server corresponding to the determined vehicle-mounted server identifier of the vehicle to form the platoon, such that the vehicle where the first vehicle-mounted server is located can form the platoon with another vehicle, and the vehicle where the first vehicle-mounted server is located can be controlled to move as a following vehicle of the other vehicle, thereby effectively reducing air resistance and reducing fuel consumption of the vehicle.

Additional features and advantages of the present disclosure will be set forth in the following description, or become apparent at least in part from the following description, or can be learned from practicing of the present disclosure. The objects and other advantages of the present disclosure can be achieved and obtained from structures specifically described in the description, claims, and drawings.

BRIEF DESCRIPTION OF THE DRAWINGS

In order to describe the technical solutions according to the embodiments of the present disclosure or the prior art more clearly, figures used in description of the embodiments or the prior art will be introduced briefly below. Obviously, the figures described below only illustrate some embodiments of the present disclosure, and other figures can be obtained by those of ordinary skill in the art based on these drawings without any inventive efforts.

DETAILED DESCRIPTION OF THE EMBODIMENTS

Figure 1:
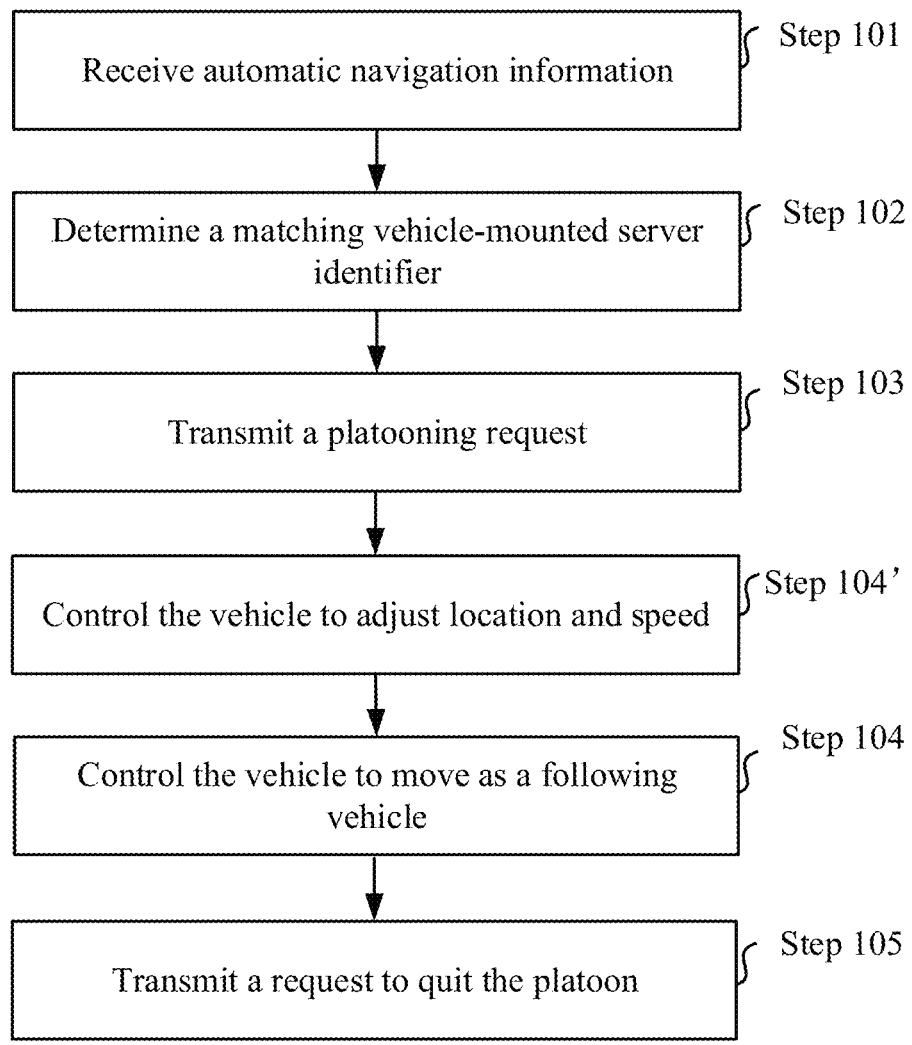
FIG. 1 is a flowchart illustrating a method for vehicle automatic navigation control according to Embodiment 1 of the present disclosure.

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

It is to be noted that a vehicle moving in the front of a platoon can be referred to as a leading vehicle, and other vehicles can be referred to as following vehicles. The leading vehicle automatically navigates according to a predetermined navigation route, and a vehicle-mounted server on the leading vehicle can transmit location information and driving information (including, but not limited to, steering wheel angle information, throttle control amount information, and brake control amount information) of the vehicle where it is located to the vehicle-mounted server of each following vehicle in accordance with a predetermined time length, such that each following vehicle can follow the movement of the leading vehicle. Every time the location information and the driving information are received, the vehicle-mounted server on each following vehicle can use a location corresponding to the received location information as a navigation target location, and when it reaches the navigation target location, control the vehicle to move according to the received driving information, so as to achieve automatic navigation of the platoon.

It is to be noted that when forming a platoon at a starting point, the vehicle-mounted server on the leading vehicle can randomly set an order (which can be denoted as an ID) in which each following vehicle follows the leading vehicle.

In order to maintain the distance between vehicles in the platoon, the vehicle-mounted server on the leading vehicle can at least transmit, according to the order in which each following vehicle follows the leading vehicle, to the vehicle-mounted server of that following vehicle a vehicle-mounted server identifier of a following vehicle immediately following it. The vehicle-mounted server on the leading vehicle or each following vehicle can transmit location information to the vehicle-mounted server on the following vehicle immediately following it based on the corresponding vehicle-mounted server identifier in accordance with a specified time length.

The vehicle-mounted server on each following vehicle can determine a distance to the vehicle (leading or following vehicle) it immediately follows based on the obtained location information of the vehicle it immediately follows and its own location information, and report the determined distance to the leading vehicle, such that the leading vehicle can control the speed of each following vehicle based on the received distances, thereby maintaining the distance between vehicles in the platoon.

When vehicles automatically navigate in the form of a platoon, the air resistance experienced by vehicles in the platoon that are blocked by other vehicles can be reduced, and thus the vehicles experiencing reduced air resistance can have lower fuel consumption.

However, with different starting points and/or destinations, vehicles (or platoons) will move separately even if they have an overlapping segment of driving route, and thus the air resistance experienced by the vehicles cannot be effectively reduced, resulting in suboptimal fuel saving effects for the vehicles.

The inventors of the present disclosure found that, even if the starting points and/or destinations of the vehicles (or platoons) are different, the vehicles (or platoons) can also form a platoon and move together, so as to reduce air resistance as much as possible and reduce fuel consumption.

For example, even if the starting points and/or destinations of the vehicles (or platoons) are different, their navigation routes may partially overlap. On the overlapping navigation routes, the vehicles (or platoons) can also form a platoon and move together, so as to reduce air resistance as much as possible and reduce fuel consumption.

As another example, even if the selected navigation routes are different and thus the navigation routes do not overlap, given the same destination, the vehicles (or platoons) can also form a platoon and move to the same destination according to the same navigation route, so as to reduce air resistance as much as possible and reduce fuel consumption.

Therefore, the present disclosure provides a solution for dynamically forming vehicles (or platoons) into a platoon in a process of automatic navigation, so as to achieve vehicle automatic navigation control. With this scheme of vehicle automatic navigation control, expansion of a platoon of autonomous vehicles can also be achieved. For example, one vehicle may form a platoon with another vehicle or join a platoon of vehicles, a platoon of vehicles may follow one vehicle to form a platoon, or a platoon of vehicles may join another platoon of vehicles.

In the following, the present disclosure will be described in further detail with reference to the figures, such that the objects, solutions, and advantages of the present disclosure will become more apparent. Obviously, the embodiments described below are only some, rather than all, of the embodiments of the present disclosure. Starting from the embodiments of the present disclosure, those skilled in the art can obtain other embodiments without applying any inventive skills and all these embodiments are to be encompassed by the scope of the present disclosure.

It is to be noted that the phrase "a plurality of" or "a number of" as used herein means two or more. The term "and/or" as used herein only represents a relationship between correlated objects, including three possibilities. For example, "A and/or B" means A only, B only, or both A and B. In addition, the symbol "/" as used herein represents an "or" relationship between the correlated objects preceding and succeeding the symbol.

It is to be noted that the terms "first" and "second" in the description and claims of the present disclosure and the above-mentioned figures are used to distinguish similar objects from each other, and are not necessarily used to describe a specific sequence or order. It should be understood that the data used in this way can be interchanged as appropriate such that the embodiments of the present disclosure can be implemented in orders other than those shown or described herein.

In addition, the terms "comprising" and "having" and any variants thereof are intended to cover non-exclusive inclusions. For example, a process, method, system, product or device that includes a series of steps or units is not necessarily limited to those steps or units that are explicitly listed, and may include other steps or units that are not explicitly listed or are inherent to the process, method, product, or device.

Embodiment 1

Embodiment 1 of the present disclosure provides a method for vehicle automatic navigation control. The method can be applied to a vehicle automatically navigating according to a predetermined navigation route. The entity for performing the method can be referred to as a vehicle-mounted server (which can also be referred to as a first vehicle-mounted server, which can be understood as a vehicle-mounted server requesting to form a platoon). The vehicle can be a vehicle that moves alone or a leading vehicle in a platoon with one or more following vehicles. The step flow of this method is shown in FIG. 1, which includes the following steps.

At step 101, automatic navigation information is received.

In this step, the first vehicle-mounted server can receive at least one piece of automatic navigation information.

One piece of automatic navigation information can be understood as corresponding to a vehicle automatically navigating according to a predetermined navigation route. The vehicle can be a vehicle that moves alone or a leading vehicle in a platoon with one or more following vehicles.

One piece of automatic navigation information can contain a navigation route, a destination, a current location, and a vehicle-mounted server identifier of a corresponding vehicle. It can be appreciated that the automatic navigation information can contain a navigation route, a destination, and a current location, and a vehicle-mounted server identifier corresponding to a vehicle automatically navigating according to a predetermined navigation route.

In this embodiment, the automatic navigation information may be automatic navigation information reported by each vehicle automatically navigating according to a predetermined navigation route, received periodically by a platooning control system and transmitted periodically to other vehicles automatically navigating according to their respective predetermined navigation routes.

At step 102, a matching vehicle-mounted server identifier is determined.

In this step, a vehicle-mounted server identifier of a vehicle to form a platoon with a vehicle where the first vehicle-mounted server is located can be determined based on automatic navigation information corresponding to the vehicle where the first vehicle-mounted server is located and the at least one piece of automatic navigation information as received. An information overlapping degree between automatic navigation information of the vehicle to form the platoon and the automatic navigation information corresponding to the vehicle where the first vehicle-mounted server is located meets a predefined requirement.

In this step, in order to determine the vehicle-mounted server identifier of the vehicle to form the platoon based on the automatic navigation information corresponding to the vehicle where the first vehicle-mounted server is located and the at least one piece of automatic navigation information as received, the automatic navigation information having an information overlapping degree meeting the predefined requirement can be determined first, and then the vehicle-mounted server identifier contained in the determined automatic navigation information can be the vehicle-mounted server identifier of the vehicle to form the platoon.

If there are at least two pieces of automatic navigation information that are determined to have the information overlapping degree meeting the predefined requirement, one of them can be selected in any arbitrary manner, e.g., a random one can be selected or the one having the highest overlapping degree of the navigation route can be selected.

In a possible implementation, the automatic navigation information having the information overlapping degree meeting the predefined requirement can be determined by, but not limited to: determining, from the received at least one piece of automatic navigation information, automatic navigation information containing a navigation route overlapping the navigation route corresponding to the first vehicle-mounted server and containing a current location within a predefined range, or automatic navigation information containing a destination identical to the destination corresponding to the first vehicle-mounted server and containing a current location within a predefined range.

It can be appreciated that the automatic navigation information corresponding to a vehicle having the at least partially overlapping navigation route and the current location within the predefined range can be determined. That is, the vehicle having the at least partially overlapping navigation route and the current location within the predefined range can be determined as the vehicle to form the platoon.

The predefined range for the current location can be set as required.

For example, in a possible implementation, the current location being within the predefined range can be understood as the current location being on the overlapping navigation route and the distance between the current location and the end point of the overlapping navigation route (in this embodiment, the distance can be understood as a length of a path on which the vehicle can move) not being smaller than a first threshold, and on the path on which the vehicle where the vehicle-mounted server receiving the automatic navigation information is located moves, in the direction pointing to the end point of the overlapping navigation route, the current location being before the location of the vehicle where the vehicle-mounted server receiving the automatic navigation information is located, and the distance between the current location and the location of the vehicle where the vehicle-mounted server receiving the automatic navigation information is located not being greater than a second threshold.

Thus, before reaching the end point of the overlapping navigation route, the vehicle corresponding to the automatic navigation information can serve as a leading vehicle of the vehicle where the vehicle-mounted server receiving the automatic navigation information is located, and form a platoon with the vehicle where the vehicle-mounted server receiving the automatic navigation information is located to move on the overlapping navigation route.

In another example, in a possible implementation, the current location being within the predefined range can be understood as the current location being located before the starting point of the overlapping navigation route, and the distance between the current location and the starting point of the overlapping navigation route not being greater than a third threshold. Thus, it can form a platoon with the vehicle where the vehicle-mounted server receiving the automatic navigation information is located in a timely manner to move on the overlapping navigation route.

In addition, automatic navigation information corresponding to a vehicle with a same destination and a current location within a specified range can be determined, that is, the vehicle with the same destination and the current location within the specified range can be determined as the vehicle to form the platoon.

The specified range for the current location can also be set as required.

For example, in a possible implementation, the current location being within the specified range can be understood as the distance between the current location and the location of the vehicle where the vehicle-mounted server receiving the automatic navigation information is located not being greater than a fourth threshold.

Thus, the vehicle where the vehicle-mounted server receiving the automatic navigation information is located can travel a short path to form the platoon with the vehicle corresponding to the automatic navigation information in a timely manner, so as to avoid increase in the fuel consumption of the vehicle where the vehicle-mounted server receiving the automatic navigation information is located.

At step 103, a platooning request is transmitted.

The platooning request is transmitted to a vehicle-mounted server (which can be referred to as a second vehicle-mounted server) corresponding to the determined vehicle-mounted server identifier of the vehicle to for the platoon, to request forming the platoon with the vehicle corresponding to the vehicle-mounted server. The platooning request can be understood as carrying an identifier corresponding to the vehicle-mounted server transmitting the platooning request, such that the vehicle-mounted server receiving the platooning request can feed back information to the vehicle-mounted server corresponding to the identifier.

At step 104, the vehicle is controlled to move as a following vehicle.

After the platooning request is transmitted, if the vehicle-mounted server receiving the platooning request agrees to form the platoon, it can determine the vehicle where the vehicle-mounted server transmitting the platooning request is located as a following vehicle, and feed back location information and driving information based on the vehicle-mounted server identifier carried in the platooning request, in accordance with a predetermined time length. The driving information may contain, but not limited to, steering wheel angle information, throttle control amount information, and brake control amount information.

Then in this step, a platooning response containing the location information and the driving information can be received and in accordance with the platooning response received each time, the vehicle where the first vehicle-mounted server is located can be controlled to move as a following vehicle of the vehicle where the vehicle-mounted server transmitting the location information and the driving information is located.

This step can be understood as receiving the location information and the driving information, and each time the location information and the driving information are received, the location corresponding to the received location information can be used as the navigation target location, and when the navigation target location is reached, the corresponding vehicle is controlled to move in accordance with the received driving information.

It is to be noted that the first vehicle-mounted server may also periodically report a distance between the vehicle where it is located and a vehicle in front of it in the platoon while controlling the vehicle where it is located to move as a following vehicle of the vehicle where the vehicle-mounted server transmitting the location information and the driving information is located, such that the leading vehicle can adjust the speed of each vehicle in the platoon to avoid collision or increase in inter-vehicle distance.

Therefore, in this step, the location information can be received in accordance with a specified time length, and each time the location information is received, the distance between the location corresponding to the received location information and its corresponding location can be determined, and the determined distance can be reported to the vehicle-mounted server transmitting the location information and the driving information.

It can be understood that after the vehicle-mounted server receiving the platooning request agrees to form the platoon, the vehicle where the vehicle-mounted server transmitting the platooning request is located can be regarded as the last following vehicle, and the order information of the following vehicles in the platoon can be updated.

If the vehicle where the vehicle-mounted server agreeing to form the platoon is located has no following vehicle before agreeing to form the platoon, then the vehicle where the vehicle-mounted server agreeing to form the platoon will be the vehicle for the vehicle where the vehicle-mounted server transmitting the platooning request is located to immediately follow. The vehicle-mounted server agreeing to form the platoon can transmit the location information of the vehicle where it is located to the vehicle-mounted server transmitting the platooning request in accordance with a specified time length.

If the vehicle where the vehicle-mounted server agreeing to form the platoon has one or more following vehicles before agreeing to form the platoon, then before agreeing to form the platoon, the last following vehicle of the vehicle where the vehicle-mounted server agreeing to form the platoon is located will be the vehicle for the vehicle-mounted server transmitting the platooning request is located to immediately follow. The vehicle-mounted server agreeing to form the platoon can instruct the vehicle-mounted server on the last following vehicle of the vehicle where it is located before agreeing to form the platoon to transmit the location information of the vehicle where it is located to the vehicle-mounted server transmitting the platooning request in accordance with a specified time length.

In this embodiment, the vehicle-mounted server agreeing to form the platoon may transmit the identifier of the vehicle-mounted server transmitting the platooning request to the vehicle-mounted server on the last following vehicle of the vehicle where it is located before agreeing to form the platoon. The vehicle-mounted server can transmit the location information of the vehicle where it is located the corresponding vehicle-mounted server based on the received vehicle-mounted server identifier in accordance with a specified time length.

Of course, if the vehicle where the vehicle-mounted server agreeing to form the platoon has one or more following vehicles before agreeing to form the platoon, the vehicle-mounted server agreeing to form the platoon can transmit the location information of the last following vehicle of the vehicle where the vehicle-mounted server agreeing to form the platoon is located before agreeing to form the platoon to the vehicle where the first vehicle-mounted server is located in accordance with a predetermined time length.

That is, in this embodiment, in a possible implementation, the vehicle-mounted server agreeing to form the platoon can obtain the location information of each following vehicle, and according to the order of each following vehicle in the platoon, transmit the location information of the vehicle in front of that following vehicle to that following vehicle in accordance with the predetermined time length.

In addition, it is to be noted that if the vehicle where the vehicle-mounted server transmitting the platooning request is a leading vehicle in a platoon and has one or more following vehicles, each following vehicle in the platoon can move as a following vehicle of the vehicle where the vehicle-mounted server transmitting the platooning request is located.

In another possible implementation, the following vehicle in the platoon can alternatively move as the following vehicle of the vehicle where the vehicle-mounted server agreeing to form the platoon is located.

If it is determined that the vehicle where the first vehicle-mounted server is located has one or more following vehicles, in order to allow each following vehicle in the platoon to move as a following vehicle of the vehicle where the vehicle-mounted server agreeing to form the platoon is located, in a possible implementation, the platooning request may further carry the one or more vehicle-mounted server identifiers corresponding to the one or more following vehicles of the vehicle where the vehicle-mounted server transmitting the platooning request is located. That is, the platooning request may further carry the one or more vehicle-mounted server identifiers corresponding to at least one following vehicle. Here, the one or more vehicle-mounted server identifiers corresponding to the one or more following vehicles of the vehicle where the first vehicle-mounted server is located as carried in the platooning request correspond to the order in which each following vehicle of the vehicle where the first vehicle-mounted server is located follows the vehicle where the first vehicle-mounted server is located.

The vehicle-mounted server receiving the platooning request may also transmit the location information and the driving information to the vehicle-mounted server corresponding to the vehicle-mounted server identifier corresponding to the at least one following vehicle in accordance with a predetermined time length, such that the following vehicle of the vehicle where the vehicle-mounted server transmitting the platooning request is located can follow the vehicle where the vehicle-mounted server receiving the platooning request is located.

Of course, after the first vehicle-mounted server receives the platooning response containing the location information and the driving information, it can stop transmission of location information and driving information to the one or more vehicle-mounted servers corresponding to the one or more following vehicles of the vehicle where the first vehicle-mounted server is located, such that the one or more vehicle-mounted servers corresponding to the one or more following vehicles of the vehicle where the first vehicle-mounted server is located control the vehicle where the vehicle-mounted server is located to move as a following vehicle of the vehicle where the second vehicle-mounted server is located in accordance with the received platooning response containing the location information and the driving information.

In addition, each following vehicle of the vehicle where the vehicle-mounted server transmitting the platooning request is located can still report information on a distance to the vehicle in front of that following vehicle to the vehicle-mounted server transmitting the platooning request.

In another possible implementation, the information on the distance to the vehicle in front of each following vehicle may alternatively be reported to the vehicle-mounted server agreeing to form the platoon.

In order to allow each following vehicle of the vehicle where the vehicle-mounted server transmitting the platooning request is located to report the information on the distance to the vehicle in front of that corresponding following vehicle to the vehicle-mounted server agreeing to form the platoon, in a possible implementation, the vehicle-mounted server transmitting the platooning request can transmit the vehicle-mounted server identifier corresponding to the automatic navigation information to that following vehicle, notifying that following vehicle to report the information on the distance to the vehicle-mounted server corresponding to the vehicle server identifier.

That is, after the first vehicle-mounted server receives the platooning response containing the location information and the driving information, it can further transmit the vehicle-mounted server identifier of the second vehicle-mounted server to the one or more vehicle-mounted servers corresponding to the one or more following vehicles of the vehicle where the first vehicle-mounted server is located, to instruct each of the one or more vehicle-mounted servers corresponding to the one or more following vehicles to report a distance to the second vehicle-mounted server. The distance is a distance, determined by the vehicle-mounted server corresponding to that following vehicle each time it receives location information in accordance with a specified time length, between a location corresponding to the received location information and its corresponding location. Here, the location information received by the one or more vehicle-mounted servers corresponding to the one or more following vehicles of the vehicle where the first vehicle-mounted server is located in accordance with the specified time length is location information corresponding to a vehicle in front of that corresponding following vehicle.

The location information received by the one or more vehicle-mounted servers corresponding to one or more following vehicles of the vehicle where the first vehicle-mounted server is located in accordance with the specified time length can be described as follows: the second vehicle-mounted server instructs, in accordance with the order in which each of the one or more following vehicles of the vehicle where the first vehicle-mounted server is located follows the vehicle where the first vehicle-mounted server is located (as the one or more vehicle-mounted server identifiers corresponding to the one or more following vehicles of the vehicle where the first vehicle-mounted server is located as carried in the platooning request correspond to the order in which each following vehicle of the vehicle where the first vehicle-mounted server is located follows the vehicle where the first vehicle-mounted server is located, and the order in which each following vehicle of the vehicle where the first vehicle-mounted server is located follows the vehicle where the first vehicle-mounted server is located can be determined), the vehicle-mounted server on the vehicle in front of that corresponding following vehicle to transmit the location information to the vehicle-mounted server on that corresponding following vehicle in accordance with the predetermined time length.

Alternatively, the location information received by the one or more vehicle-mounted servers corresponding to the one or more following vehicles of the vehicle where the first vehicle-mounted server is located in accordance with the specified time length can be described as follows: the second vehicle-mounted server transmits, in accordance with the order in which each of the one or more following vehicles of the vehicle where the first vehicle-mounted server is located follows the vehicle where the first vehicle-mounted server is located, the location information of the vehicle in front of that corresponding following vehicle to the vehicle-mounted server on that corresponding following vehicle in accordance with the predetermined time length.

In this embodiment, it is also to be noted that after the vehicle-mounted server receiving the platooning request agrees to form the platoon, and before the vehicle where the vehicle-mounted server transmitting the platooning request is located, as the following vehicle, feeds back the location information and the driving information in accordance with the predetermined time length, it can be further determined that the distance between the vehicle where the vehicle-mounted server transmitting the platooning request is located and the last vehicle of the platoon it belongs to is not greater than a threshold, so as to ensure that the distance between vehicles in the platoon is small and the air resistance and accordingly the fuel consumption can be further reduced. At the same time, in order to prevent other vehicles from cutting in line and blocking movement of the vehicles, it can be determined that the speed difference is not greater than a threshold, so as to avoid collision or increase in the inter-vehicle distance.

The vehicle-mounted server receiving the platooning request may determine that the distance between the vehicle where the vehicle-mounted server transmitting the platooning request is located and the last vehicle in its platoon is not greater than a threshold, and that the speed difference is not greater than a threshold in e.g., any of the following schemes.

When the second vehicle-mounted server determines to agree to form the platoon, it can determine whether the vehicle where the second vehicle-mounted server is located has one or more following vehicles before agreeing to form the platoon. If the vehicle where the second vehicle-mounted server is located has no following vehicle before agreeing to form the platoon, it can transmit a prompt message to the first vehicle-mounted server transmitting the platooning request in accordance with a specific time length. The prompt message carries location information and speed information of the vehicle where the second vehicle-mounted server is located. If the vehicle where the second vehicle-mounted server is located has one or more following vehicles before agreeing to form the platoon, it can instruct a vehicle-mounted server on the last one of the one or more following vehicles of the vehicle where the second vehicle-mounted server is located before agreeing to form the platoon to transmit a prompt message to the first vehicle-mounted server transmitting the platooning request in accordance with a specific time length. The prompt message carries location information and speed information of the last following vehicle.

In response to receiving a confirmation message transmitted from the first vehicle-mounted server transmitting the platooning request, location information and driving information of the vehicle where the second vehicle-mounted server is located can be transmitted to the first vehicle-mounted server transmitting the platooning request in accordance with the predetermined time length.

Here, the confirmation message is transmitted by the first vehicle-mounted server transmitting the platooning request after controlling, each time the prompt message is received, the vehicle where the first vehicle-mounted server is located to approach a location corresponding to the location information carried in the prompt message and controlling, when a distance between the vehicle where the first vehicle-mounted server is located and the location corresponding to the location information carried in the received prompt message is not greater than a threshold, a difference between a speed of the vehicle where the first vehicle-mounted server is located and a speed corresponding to the speed information carried in the prompt message not to be greater than a threshold.

It can be understood that the confirmation message can be transmitted by the vehicle-mounted server transmitting the platooning request after controlling, each time the prompt message is received, the vehicle where the first vehicle-mounted server is located to approach the location corresponding to the location information carried in the prompt message and controlling, when the location corresponding to the location information carried in the received prompt message is located before the location corresponding to the vehicle where the first vehicle-mounted server is located on the route of the vehicle where the first vehicle-mounted server is located in the direction in which the vehicle where the first vehicle-mounted server is located is moving (that is, in the direction pointing to the end point of the overlapping navigation route when the determined automatic navigation information corresponds to partially overlapping navigation routes, or in the direction pointing to the destination in the case of the same destination) and the distance between the vehicle where the first vehicle-mounted server is located and the location corresponding to the location information carried in the received prompt message is not greater than the threshold, the difference between the speed of the vehicle where the first vehicle-mounted server is located and the speed corresponding to the speed information carried in the prompt message not to be greater than the threshold.

According, in this embodiment, the following step may be performed after step 103 and before step 104.

At step 104', the vehicle is controlled to adjust the location and the speed.

In this step, the vehicle-mounted server transmitting the platooning request can receive a prompt message in accordance with a specific time length, the prompt message carrying location information and speed information, and control, each time the prompt message is received, the vehicle where the vehicle-mounted server is located to approach a location corresponding to the location information carried in the prompt message, control, when a distance between the vehicle where the vehicle-mounted server is located and the location corresponding to the location information carried in the received prompt message is not greater than a threshold, a difference between a speed of the vehicle where the vehicle-mounted server is located and a speed corresponding to the speed information carried in the prompt message not to be greater than a threshold, and transmit a confirmation message to the second vehicle-mounted server.

Further, when the overlapping navigation route ends, or when the destination is reached, the dynamic platooning of the vehicles (or platoons) can be ended.

That is, in this embodiment, step 105 may be further included.

At step 105, a request to quit the platoon is transmitted.

If the navigation route corresponding to the vehicle-mounted server receiving the platooning request at least partially overlaps the navigation route corresponding to the first vehicle-mounted server, the first vehicle-mounted server transmitting the platooning request can transmit, when determining that its corresponding location is a specified location in an overlapping part of the navigation routes, e.g., the destination or some location close to the destination, a request to quit the platoon to the vehicle-mounted server receiving the platooning request, and determine a navigation target location based on its corresponding navigation route.

If the destination corresponding to the vehicle-mounted server receiving the platooning request is the same as the destination corresponding to the first vehicle-mounted server, the first vehicle-mounted server transmitting the platooning request can transmit, when determining that the its corresponding location is its corresponding destination, a request to quit the platoon to the vehicle-mounted server receiving the platooning request.

Of course, if the vehicle where the first vehicle-mounted server is located was a leading vehicle previously, then after quitting the platoon, the vehicle where the first vehicle-mounted server is located can move as the leading vehicle again.

In this case, when transmission of location information and driving information to the vehicle-mounted server corresponding to each of the one or more following vehicles of the vehicle where the first vehicle-mounted server is located has been stopped, after the request to quit the platoon is transmitted, transmission of the location information and the driving information to the vehicle-mounted server corresponding to each of the one or more following vehicles of the vehicle where the first vehicle-mounted server is located can be resumed, such that the vehicle-mounted server corresponding to that following vehicle controls that following vehicle to move as a following vehicle of the vehicle where the first vehicle-mounted server is located in accordance with the location information and the driving information.

When the vehicle-mounted server identifier of the second vehicle-mounted server has been transmitted to the vehicle-mounted server corresponding to each of the one or more following vehicles of the vehicle where the first vehicle-mounted server is located, after the request to quit the platoon is transmitted, the vehicle-mounted server identifier of the first vehicle-mounted server can be transmitted to the vehicle-mounted server corresponding to each of the one or more following vehicles of the vehicle where the first vehicle-mounted server is located, to instruct each of the one or more vehicle-mounted servers corresponding to the one or more following vehicles to report a distance to the first vehicle-mounted server. The distance is a distance, determined by the vehicle-mounted server corresponding to that following vehicle each time it receives location information in accordance with a specified time length, between a location corresponding to the received location information and its corresponding location.

Embodiment 2

Figure 2:
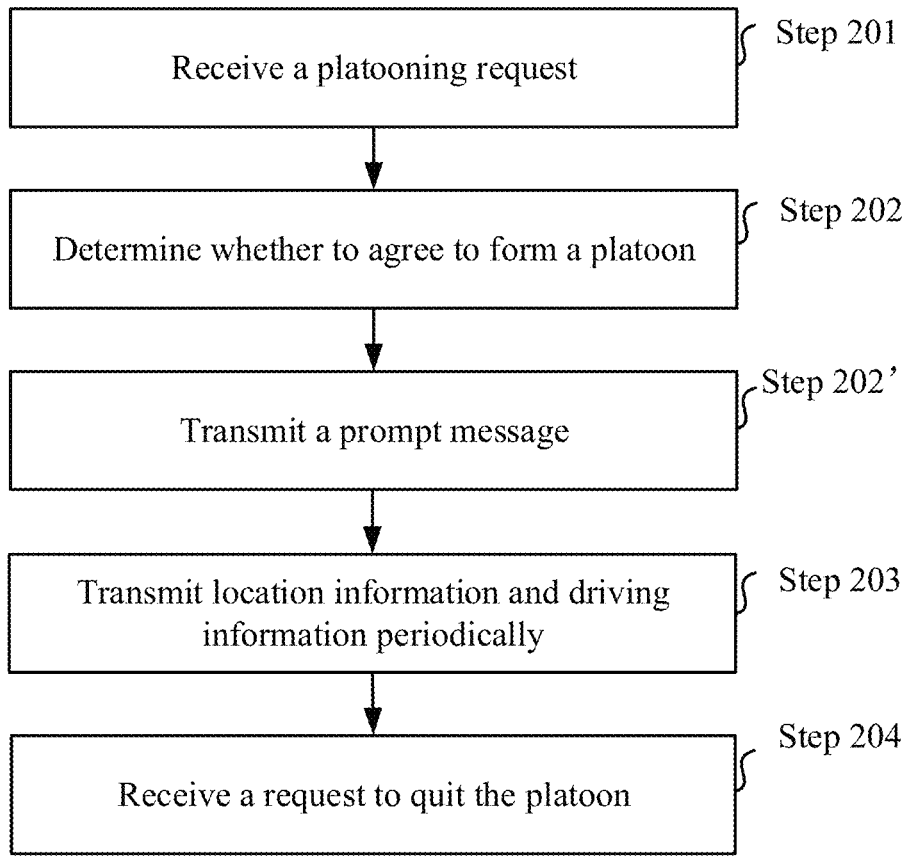
FIG. 2 is a flowchart illustrating a method for vehicle automatic navigation control according to Embodiment 2 of the present disclosure.

Embodiment 2 of the present disclosure provides a method for vehicle automatic navigation control. The method can be applied to a vehicle automatically navigating according to a predetermined navigation route. The entity for performing the method can be referred to as a vehicle-mounted server (which can also be referred to as a second vehicle-mounted server, which can be understood as a vehicle-mounted server accepting a request to form a platoon). The vehicle can be a vehicle that moves alone or a leading vehicle in a platoon with one or more following vehicles. The step flow of this method is shown in FIG. 2, which includes the following steps.

At step 201, a platooning request is received.

In this step, the vehicle-mounted server corresponding to the selected automatic navigation information can receive the platooning request.

The platooning request is transmitted by a vehicle-mounted server (i.e., a first vehicle-mounted server), after receiving at least one piece of automatic navigation information each containing a navigation route, a destination, a current location, and a vehicle-mounted server identifier of a corresponding vehicle, and determining, based on automatic navigation information corresponding to a vehicle where the first vehicle-mounted server is located and the at least one piece of automatic navigation information, a vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement, to the second vehicle-mounted server corresponding to the determined vehicle-mounted server identifier of the vehicle to form the platoon. The platooning request can carry a vehicle-mounted server identifier corresponding to the first vehicle-mounted server.

At step 202, it is determined whether to agree to form the platoon.

After receiving the platooning request, it can be determined in this step whether to agree to form the platoon.

In this embodiment, the determining condition can be set as needed, and it can be determined whether to agree to form the platoon according to whether the set determining condition is met.

In a possible implementation, the platooning request may carry a specified parameter, and the operation of determining whether to agree to form the platoon may include: determining whether the specified parameter meets a predetermined requirement.

The specified parameter may include, but not limited to, at least one of the following parameters: a vehicle type, a power system parameter, a braking system parameter, a positioning accuracy, a positioning delay, a control system accuracy, a control system delay, a lane-changing instruction version, an acceleration/deceleration instruction version, a queue management instruction version, a number of vehicles requesting to join the platoon, etc.

If it is determined to agree to form the platoon, the method can proceed with step 203.

At step 203, location information and driving information are transmitted periodically.

In this step, the location information and driving information of the vehicle where the second vehicle-mounted server is located can be transmitted to the vehicle-mounted server transmitting the platooning request based on the vehicle-mounted server identifier carried in the platooning request in accordance with a predetermined time length. The driving information may contain, but not limited to, steering wheel angle information, throttle control amount information, and brake control amount information.

Of course, when the platooning request further carries one or more vehicle-mounted server identifiers respectively corresponding to the one or more following vehicles of the vehicle where the first vehicle-mounted server is located, the one or more vehicle-mounted server identifiers respectively corresponding to the one or more following vehicles of the vehicle where the first vehicle-mounted server is located corresponding to an order in which that following vehicle follows the vehicle where the first vehicle-mounted server is located, in this step, the location information and the driving information of the vehicle where the second vehicle-mounted server is located can also be transmitted to the one or more vehicle-mounted servers corresponding to the one or more vehicle-mounted server identifiers carried in the platooning request, other than the vehicle-mounted server identifier corresponding to the first vehicle-mounted server, in accordance with the predetermined time length.

It is to be noted that, if it is determined in step 202 to agree to form the platoon, the following step may also be included before step 203.

At step 202', a prompt message is transmitted.

In this step, the prompt message can be transmitted to the vehicle-mounted server transmitting the platooning request in accordance with a specific time length. The prompt message may carry location information and speed information of the vehicle where the second vehicle-mounted server is located.

Step 203 can be performed in response to receiving a confirmation message transmitted from the vehicle-mounted server transmitting the platooning request.

Here, the confirmation message is transmitted by the vehicle-mounted server transmitting the platooning request after controlling, each time the prompt message is received, the vehicle where the first vehicle-mounted server is located to approach a location corresponding to the location information carried in the prompt message and controlling, when a distance between the vehicle where the first vehicle-mounted server is located and the location corresponding to the location information carried in the received prompt message is not greater than a threshold, a difference between a speed of the vehicle where the first vehicle-mounted server is located and a speed corresponding to the speed information carried in the prompt message not to be greater than a threshold.

Of course, the operation of transmitting the prompt message to the vehicle-mounted server transmitting the platooning request in accordance with the specific time length can be understood as follows. It is determined whether the vehicle where the second vehicle-mounted server is located has one or more following vehicles before agreeing to form the platoon, and if the vehicle where the second vehicle-mounted server is located has no following vehicle before agreeing to form the platoon, the prompt message is transmitted to the vehicle-mounted server transmitting the platooning request in accordance with the specific time length.

On the other hand, if it is determined that the vehicle where the second vehicle-mounted server is located has one or more following vehicle before agreeing to form the platoon, the vehicle-mounted server on the last following vehicle of the vehicle where the second vehicle-mounted server is located before agreeing to form the platoon can be instructed to transmit the prompt message to the first vehicle-mounted server transmitting the platooning request in accordance with the specific time length. The prompt message carries the location information and the speed information of the last following vehicle. Step 203 is performed when a confirmation message transmitted by the vehicle-mounted server transmitting the platooning request is received.

It is to be noted that if it is determined in step 202 to agree to form the platoon, then in step 203, the location information can also be transmitted periodically to the vehicle-mounted server transmitting the platooning request. Alternatively, a vehicle-mounted server on another corresponding vehicle can be instructed to periodically transmit the location information of the vehicle where it is located to the vehicle-mounted server transmitting the platooning request, and receive distance information reported by the vehicle-mounted server transmitting the platooning request.

Here, it can be determined whether the vehicle where the second vehicle-mounted server is located has one or more following vehicles before agreeing to form the platoon.

If the vehicle where the second vehicle-mounted server is located has no following vehicle before agreeing to form the platoon, the second vehicle-mounted server can transmit location information of the vehicle where the second vehicle-mounted server is located to the first vehicle-mounted server transmitting the platooning request in accordance with a specified time length.

If the vehicle where the second vehicle-mounted server has one or more following vehicles before agreeing to form the platoon, the second vehicle-mounted server can instruct a vehicle-mounted server on the last one of the one or more following vehicles of the vehicle where the second vehicle-mounted server is located before agreeing to form the platoon to transmit location information of the last following vehicle to the first vehicle-mounted server transmitting the platooning request in accordance with a specified time length, or the second vehicle-mounted server can transmit the location information of the last following vehicle before agreeing to form the platoon to the vehicle where the first vehicle-mounted server is located in accordance with the predetermined time length.

In addition, in step 203, the location information can be transmitted periodically to the one or more vehicle-mounted servers respectively on the one or more following vehicles of the vehicle where the vehicle-mounted server transmitting the platooning request is located. Alternatively, a vehicle-mounted server on another corresponding vehicle can be instructed to transmit location information to the one or more vehicle-mounted servers on the one or more following vehicles of the vehicle where the vehicle-mounted server transmitting the platooning request is located, and receive distance information reported by the one or more vehicle-mounted servers respectively on the one or more following vehicles of the vehicle where the vehicle-mounted server transmitting the platooning request is located.

That is, in accordance with the order in which each of the one or more following vehicles of the vehicle where the first vehicle-mounted server is located follows the vehicle where the first vehicle-mounted server is located, the vehicle-mounted server on the vehicle in front of that following vehicle can be instructed to transmit location information to the vehicle-mounted server on that following vehicle in accordance with the predetermined time length, or in accordance with the order in which each of the one or more following vehicles of the vehicle where the first vehicle-mounted server is located follows the vehicle where the first vehicle-mounted server is located, location information of the vehicle in front of that following vehicle can be transmitted to the vehicle-mounted server on that following vehicle in accordance with the predetermined time length.

Further, a distance reported by the vehicle-mounted server corresponding to the vehicle-mounted server identifier carried in the platooning request, other than the vehicle-mounted server identifier corresponding to the first vehicle-mounted server, can be received. The distance can be a distance, determined by the vehicle-mounted server corresponding to the following vehicle of the vehicle where the first vehicle-mounted server is located each time it receives location information in accordance with a specified time length, between a location corresponding to the received location information and its corresponding location.

Further, this embodiment may further include step 204.

At step 204, a request to quit the platoon is received.

In this step, the request to quit the platoon as transmitted from the vehicle-mounted server transmitting the platooning request can be received, and according to the request to quit the platoon, transmission of location information and driving information to the vehicle-mounted server transmitting the platooning request can be stopped.

The request to quit the platoon may carry the identifier of the vehicle-mounted server transmitting the platooning request, and the vehicle-mounted server receiving the request to quit the platoon may stop transmission of location information and driving information to the vehicle-mounted server corresponding to the vehicle-mounted server identifier carried therein.

Of course, if the location information and the driving information of the vehicle where the second vehicle-mounted server is located has been transmitted to one or more vehicle-mounted servers respectively corresponding to the one or more vehicle-mounted server identifiers carried in the platooning request, other than the vehicle-mounted server identifier corresponding to the first vehicle-mounted server, in accordance with the predetermined time length, then in this step, transmission of the location information and driving information of the vehicle where the second vehicle-mounted server is located to the one or more vehicle-mounted servers corresponding to the one or more vehicle-mounted server identifiers carried in the platooning request, other than the vehicle-mounted server identifier corresponding to the first vehicle-mounted server, can be stopped.

In a possible implementation, the request to quit the platoon may further carry the one or more vehicle server identifiers respectively corresponding to the one or more following vehicles of the vehicle where the vehicle server transmitting the platooning request is located.

Of course, if it is desired that any following vehicle should continue to follow the vehicle where the vehicle-mounted server transmitting the request to quit the platoon is located, then the vehicle-mounted server transmitting the request to quit the platoon can further retransmit the location information and driving information of the vehicle where it is located to the vehicle-mounted server on the corresponding following vehicle.

In addition, after the vehicle-mounted server transmitting the platooning request transmits the request to quit the platoon, it may also stop reporting the information on the distance to the vehicle in front of it to the vehicle-mounted server agreeing to form the platoon.

The second vehicle-mounted server can stop receiving the distance reported by the first vehicle-mounted server corresponding to the vehicle-mounted server identifier carried in the platooning request.

If each following vehicle of the vehicle-mounted server transmitting the platooning request also reports the information on the distance to the vehicle in front of it to the vehicle-mounted server agreeing to form the platoon, then the following vehicle can also stop reporting the information on the distance to the vehicle in front of it to the vehicle-mounted server agreeing to form the platoon.

The second vehicle-mounted server can stop reception of the distance reported by the vehicle-mounted server corresponding to the vehicle-mounted server identifier carried in the platooning request, other than the vehicle-mounted server identifier corresponding to the first vehicle-mounted server.

In a possible implementation, the vehicle-mounted server transmitting the request to quit the platoon can transmit the identifier of the vehicle-mounted server agreeing to form the platoon to each corresponding following vehicle, to notify each following vehicle to stop reporting the distance information to the vehicle-mounted server corresponding to the vehicle server identifier.

Of course, if it is desired that any following vehicle should continue to follow the vehicle where the vehicle-mounted server transmitting the request to quit the platoon is located, then the vehicle-mounted server transmitting the request to quit the platoon can also notify the vehicle-mounted server on the corresponding following vehicle to retransmit the distance information to the vehicle-mounted server transmitting the request to quit the platoon.

In the following, the solutions provided in Embodiment 1 and Embodiment 2 of the present disclosure will be explained with reference to a specific example.

Embodiment 3

Embodiment 3 of the present disclosure provides a method for vehicle automatic navigation control. It is assumed that the vehicle where the vehicle-mounted server receiving at least one piece of automatic navigation information is located is a leading vehicle with one following vehicle, and the platoon can be referred to as a rear platoon.

The vehicle-mounted server on the leading vehicle of the rear platoon determines, from the received at least one piece of automatic navigation information, the automatic navigation information containing a navigation route at least partially overlapping its own corresponding navigation route and a current location within a predefined range. The vehicle where the vehicle-mounted server corresponding to the automatic navigation information is located is also a leading vehicle with one following vehicle, and the platoon can be referred to as a front platoon.

Figure 3:
FIG. 3 is a schematic diagram showing a location relationship in a platoon according to Embodiment 3 of the present disclosure.

It is assumed that, in this case, on the overlapping navigation route (as shown by the straight line with arrow in FIG. 3, with the arrow pointing to the direction in which the platoons move), the front platoon moves in the front and the rear platoon moves behind the front platoon, individually. Then, the rear platoon can form a platoon with the front platoon to move together, and the method according to in this embodiment can further include the following steps.

In a first step, the vehicle-mounted server on the leading vehicle of the rear platoon transmits a platooning request to the vehicle-mounted server on the leading vehicle of the front platoon.

The platooning request may carry the vehicle-mounted server identifier corresponding to the leading vehicle in the rear platoon, the vehicle-mounted server identifier corresponding to the following vehicle in the rear platoon, and specified parameters.

In a second step, the vehicle-mounted server on the leading vehicle of the front platoon determines whether to agree to form the platoon.

After receiving the platooning request, the vehicle-mounted server on the leading vehicle of the front platoon determines whether each of the specified parameters meets a corresponding predetermined requirement, and if so, determines to agree to the form the platoon.

In a third step, after the vehicle-mounted server on the leading vehicle of the front platoon determines to agree to form the platoon, it assigns an ID to each vehicle in the rear platoon, and determines the leading vehicle in the rear platoon as the second following vehicle in the platoon, and the following vehicle in the rear platoon as the third following vehicle in the platoon.

In a fourth step, the vehicle-mounted server on the leading vehicle of the front platoon instructs the vehicle-mounted server on the last following vehicle before agreeing to form the platoon (that is, the last following vehicle in the front platoon) to transmit a prompt message periodically to the vehicle-mounted server on the leading vehicle of the rear platoon.

In a fifth step, the vehicle-mounted server on the leading vehicle in the rear platoon controls the vehicle where it is located to adjust location and speed according to the received prompt message until the distance to the last following vehicle in the front platoon is small and the speed is close to the speed of the last following vehicle in the front platoon, and transmits a confirmation message to the vehicle-mounted server on the leading vehicle of the front platoon.

In a sixth step, after receiving the confirmation message, the vehicle-mounted server on the leading vehicle of the front platoon transmits the location information and driving information of the vehicle where it is located to the leading vehicle and the following vehicle in the rear platoon periodically.

In a seventh step, the leading vehicle and the following vehicle in the rear platoon move as following vehicles of the leading vehicle of the front platoon in accordance with the received location information and driving information.

According to the solutions provided in Embodiments 1~3 of the present disclosure, it is possible to combine one platoon with another easily and safely, such that the fuel saving effect of each platoon can be improved, and the fuel consumption can be effectively reduced.

Correspondingly to the methods according to Embodiments 1~3, the following apparatus are provided.

Embodiment 4

Figure 4:
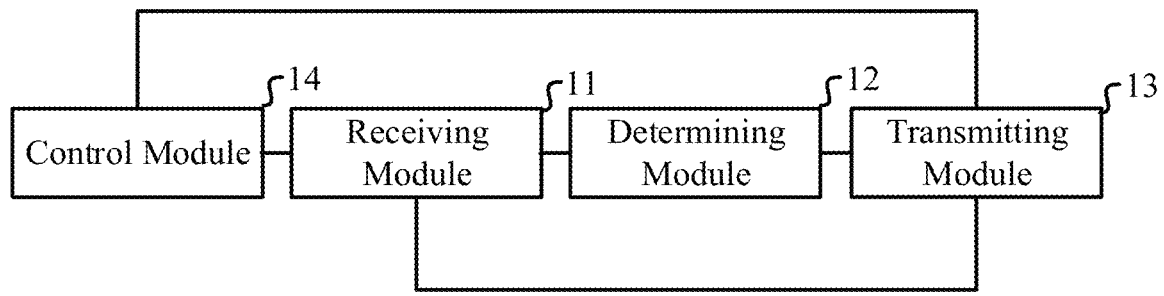
FIG. 4 is a schematic diagram showing a structure of an apparatus for vehicle automatic navigation control according to Embodiment 4 of the present disclosure.

Embodiment 4 of the present disclosure provides an apparatus for vehicle automatic navigation control. The apparatus may have a structure as shown in FIG. 4, including:

a receiving module 11 configured to receive at least one piece of automatic navigation information each containing a navigation route, a destination, a current location, and a vehicle-mounted server identifier of a corresponding vehicle, and receive a platooning response containing location information and driving information, the location information and driving information being fed back from a second vehicle-mounted server receiving a platooning request based on a vehicle-mounted server identifier carried in the platooning request in accordance with a predetermined time length, the driving information containing steering wheel angle information, throttle control amount information, and brake control amount information;

a determining module 12 configured to determine, based on automatic navigation information corresponding to a vehicle where the first vehicle-mounted server is located and the at least one piece of automatic navigation information, a vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement;

a transmitting module 13 configured to transmit the platooning request to the second vehicle-mounted server corresponding to the determined vehicle-mounted server identifier of the vehicle to form the platoon, the platooning request carrying the vehicle-mounted server identifier corresponding to the first vehicle-mounted server; and a control module 14 configured to control, in accordance with the platooning response received each time, the vehicle where the first vehicle-mounted server is located to move as a following vehicle of the vehicle where the second vehicle-mounted server is located.

Here, the vehicle where the first vehicle-mounted server is located has one or more following vehicles, and/or the vehicle where the second vehicle-mounted server is located has one or more following vehicles.

In a possible implementation, the determining module 12 can be further configured to, subsequent to determining the vehicle-mounted server identifier of the vehicle to form the platoon with the vehicle where the first vehicle-mounted server is located, and prior to the transmitting module 13 transmitting the platooning request to the second vehicle-mounted server corresponding to the determined vehicle-mounted server identifier of the vehicle to form the platoon: determine whether the vehicle where the first vehicle-mounted server is located has one or more following vehicles.

When it is determined that the vehicle where the first vehicle-mounted server is located has one or more following vehicles, the transmitting module 13 can transmit the platooning request to the second vehicle-mounted server corresponding to the determined vehicle-mounted server identifier of the vehicle to form the platoon. The platooning request further carries one or more vehicle-mounted server identifiers respectively corresponding to the one or more following vehicles of the vehicle where the first vehicle-mounted server is located. The one or more vehicle-mounted server identifiers respectively corresponding to the one or more following vehicles of the vehicle where the first vehicle-mounted server is located correspond to an order in which that one or more following vehicles follow the vehicle where the first vehicle-mounted server is located.

After the receiving module 11 receives the platooning response containing the location information and the driving information, the transmitting module 13 can be further configured to: stop transmission of location information and driving information to the one or more vehicle-mounted servers respectively corresponding to the one or more following vehicles of the vehicle where the first vehicle-mounted server is located, such that the one or more vehicle-mounted servers respectively corresponding to the one or more following vehicles of the vehicle where the first vehicle-mounted server is located control the vehicle where the vehicle-mounted server is located to move as a following vehicle of the vehicle where the second vehicle-mounted server is located in accordance with the received platooning response containing the location information and the driving information.

Further, in a possible implementation, after the receiving module 11 receives the platooning response containing the location information and the driving information, the transmitting module 13 can be further configured to: transmit the vehicle-mounted server identifier of the second vehicle-mounted server to the one or more vehicle-mounted servers respectively corresponding to the one or more following vehicles of the vehicle where the first vehicle-mounted server is located, to instruct each of the one or more vehicle-mounted servers corresponding to the one or more following vehicles to report a distance to the second vehicle-mounted server. The distance is a distance, determined by the vehicle-mounted server corresponding to that following vehicle each time it receives location information in accordance with a specified time length, between a location corresponding to the received location information and its corresponding location.

The location information received by the one or more vehicle-mounted servers corresponding to the one or more following vehicles of the vehicle where the first vehicle-mounted server is located in accordance with the specified time length can be location information corresponding to a vehicle in front of that corresponding following vehicle.

In a possible implementation, the receiving module 11 can further configured to receive a prompt message in accordance with a specific time length, the prompt message carrying location information and speed information.

The control module 14 can be further configured to control, each time the prompt message is received, the vehicle where the first vehicle-mounted server is located to approach a location corresponding to the location information carried in the prompt message, and control, when a distance between the vehicle where the first vehicle-mounted server is located and the location corresponding to the location information carried in the received prompt message is not greater than a threshold, a difference between a speed of the vehicle where the first vehicle-mounted server is located and a speed corresponding to the speed information carried in the prompt message not to be greater than a threshold.

The transmitting module 13 can be further configured to transmit a confirmation message to the second vehicle-mounted server, when the distance between the vehicle where the first vehicle-mounted server is located and the location corresponding to the location information carried in the received prompt message is not greater than the threshold, and the difference between the speed of the vehicle where the first vehicle-mounted server is located and the speed corresponding to the speed information carried in the prompt message is not greater than the threshold.

In a possible implementation, the receiving module 11 can be further configured to receive the location information in accordance with a specified time length.

The transmitting module 13 can be further configured to determine, each time the location information is received, a distance between a location corresponding to the received location information and its corresponding location, and report the determined distance to the second vehicle-mounted server transmitting the location information and the driving information.

In a possible implementation, when a navigation route corresponding to the first vehicle-mounted server and a navigation route corresponding to the second vehicle-mounted server receiving the platooning request at least partially overlap, the transmitting module 13 can be further configured to transmit, when the first vehicle-mounted server determines that its corresponding location is a specified location in an overlapping part of the navigation routes, a request to quit the platoon to the second vehicle-mounted server receiving the platooning request, and determine a navigation target location based on its corresponding navigation route.

In a possible implementation, when a destination corresponding to the first vehicle-mounted server is same as a destination corresponding to the second vehicle-mounted server receiving the platooning request, the transmitting module 13 can be further configured to transmit, when the first vehicle-mounted server determines that its corresponding location is its corresponding destination, a request to quit the platoon to the second vehicle-mounted server receiving the platooning request.

Further, in a possible implementation, after the transmitting module 13 transmits the request to quit the platoon to the second vehicle-mounted server receiving the platooning request, the transmitting module 13 can be further configured to resume transmission of the location information and the driving information to the one or more vehicle-mounted servers respectively corresponding to the one or more following vehicles of the vehicle where the first vehicle-mounted server is located, such that the vehicle-mounted server corresponding to that following vehicle controls that following vehicle to move as a following vehicle of the vehicle where the first vehicle-mounted server is located in accordance with the location information and the driving information.

Further, in a possible implementation, after the transmitting module 13 transmits the request to quit the platoon to the second vehicle-mounted server receiving the platooning request, the transmitting module 13 can be further configured to transmit the vehicle-mounted server identifier of the first vehicle-mounted server to the one or more vehicle-mounted servers corresponding to the one or more following vehicles of the vehicle where the first vehicle-mounted server is located, to instruct each of the one or more vehicle-mounted servers corresponding to the one or more following vehicles to report a distance to the first vehicle-mounted server. The distance is a distance, determined by the vehicle-mounted server corresponding to that following vehicle each time it receives location information in accordance with a specified time length, between a location corresponding to the received location information and its corresponding location.

Embodiment 5

Figure 5:
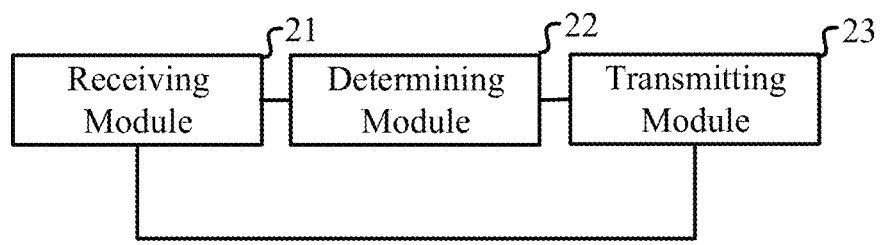
FIG. 5 is a schematic diagram showing a structure of an apparatus for vehicle automatic navigation control according to Embodiment 5 of the present disclosure.

Embodiment 5 of the present disclosure provides an apparatus for vehicle automatic navigation control. The apparatus may have a structure as shown in FIG. 5, including:

a receiving module 21 configured to receive, by a second vehicle-mounted server, a platooning request carrying a vehicle-mounted server identifier corresponding to a first vehicle-mounted server, the platooning request being transmitted by the first vehicle-mounted server, after receiving at least one piece of automatic navigation information each containing a navigation route, a destination, a current location, and a vehicle-mounted server identifier of a corresponding vehicle, and determining, based on automatic navigation information corresponding to a vehicle where the first vehicle-mounted server is located and the at least one piece of automatic navigation information, a vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement, to the second vehicle-mounted server corresponding to the determined vehicle-mounted server identifier of the vehicle to form the platoon;

a determining module 22 configured to determine whether to agree to form the platoon based on the platooning request; and a transmitting module 23 configured to transmit, when it is determined to agree to form the platoon, location information and driving information of the vehicle where the second vehicle-mounted server is located to the first vehicle-mounted server transmitting the platooning request based on the vehicle-mounted server identifier carried in the platooning request in accordance with a predetermined time length, the driving information containing steering wheel angle information, throttle control amount information, and brake control amount information.

The vehicle where the first vehicle-mounted server is located has one or more following vehicles, and/or the vehicle where the second vehicle-mounted server is located has one or more following vehicles.

In a possible implementation, the transmitting module 23 can be further configured to transmit the location information and the driving information of the vehicle where the second vehicle-mounted server is located to one or more vehicle-mounted servers corresponding to one or more vehicle-mounted server identifiers carried in the platooning request, other than the vehicle-mounted server identifier corresponding to the first vehicle-mounted server, in accordance with the predetermined time length.

Further, in a possible implementation, the transmitting module 23 can be further configured to instruct, in accordance with the order in which each of the one or more following vehicles of the vehicle where the first vehicle-mounted server is located follows the vehicle where the first vehicle-mounted server is located, the vehicle-mounted server on the vehicle in front of that corresponding following vehicle to transmit location information to the vehicle-mounted server on that corresponding following vehicle in accordance with the predetermined time length, or transmit, in accordance with the order in which each of the one or more following vehicles of the vehicle where the first vehicle-mounted server is located follows the vehicle where the first vehicle-mounted server is located, location information of the vehicle in front of that corresponding following vehicle to the vehicle-mounted server on that corresponding following vehicle in accordance with the predetermined time length.

The receiving module 21 can be further configured to receive a distance reported by the vehicle-mounted server corresponding to the vehicle-mounted server identifier carried in the platooning request, other than the vehicle-mounted server identifier corresponding to the first vehicle-mounted server. The distance is a distance, determined by the vehicle-mounted server corresponding to that following vehicle of the vehicle where the first vehicle-mounted server is located each time it receives location information in accordance with a specified time length, between a location corresponding to the received location information and its corresponding location.

In a possible implementation, the transmitting module 23 can be configured to:

determine, when it is determined to agree to form the platoon, whether the vehicle where the second vehicle-mounted server is located has one or more following vehicles before agreeing to form the platoon, and if the vehicle where the second vehicle-mounted server is located has no following vehicle before agreeing to form the platoon, transmit a prompt message to the first vehicle-mounted server transmitting the platooning request in accordance with a specific time length, the prompting message carrying location information and speed information of the vehicle where the second vehicle-mounted server is located, or if the vehicle where the second vehicle-mounted server has one or more following vehicles before agreeing to form the platoon, instruct a vehicle-mounted server on the last one of the one or more following vehicles of the vehicle where the second vehicle-mounted server is located before agreeing to form the platoon to transmit a prompt message to the first vehicle-mounted server transmitting the platooning request in accordance with a specific time length, the prompt message carrying location information and speed information of the last following vehicle; and transmit, in response to receiving a confirmation message transmitted from the first vehicle-mounted server transmitting the platooning request, location information and driving information of the vehicle where the second vehicle-mounted server is located to the first vehicle-mounted server transmitting the platooning request in accordance with the predetermined time length.

The confirmation message is transmitted by the first vehicle-mounted server transmitting the platooning request after controlling, each time the prompt message is received, the vehicle where the first vehicle-mounted server is located to approach a location corresponding to the location information carried in the prompt message and controlling, when a distance between the vehicle where the first vehicle-mounted server is located and the location corresponding to the location information carried in the received prompt message is not greater than a threshold, a difference between a speed of the vehicle where the first vehicle-mounted server is located and a speed corresponding to the speed information carried in the prompt message not to be greater than a threshold.

In a possible implementation, the platooning request received by the receiving module 21 can carry a specified parameters, and the determining module 22 can be configured to:

determine whether the vehicle where the second vehicle-mounted server is located has one or more following vehicles before agreeing to form the platoon;

if the vehicle where the second vehicle-mounted server is located has no following vehicle before agreeing to form the platoon, transmit location information of the vehicle where the second vehicle-mounted server is located to the first vehicle-mounted server transmitting the platooning request in accordance with a specified time length; and if the vehicle where the second vehicle-mounted server has one or more following vehicles before agreeing to form the platoon, instruct a vehicle-mounted server on the last one of the one or more following vehicles of the vehicle where the second vehicle-mounted server is located before agreeing to form the platoon to transmit location information of the last following vehicle to the first vehicle-mounted server transmitting the platooning request in accordance with a specified time length, or transmit the location information of the last following vehicle before agreeing to form the platoon to the vehicle where the first vehicle-mounted server is located in accordance with the predetermined time length.

In a possible implementation, the receiving module 21 can be further configured to receive a request to quit the platoon as transmitted from the first vehicle-mounted server transmitting the platooning request.

The transmitting module 23 can be further configured to stop transmission of location information and driving information to the first vehicle-mounted server transmitting the platooning request in accordance with the request to quit the platoon.

Further, in a possible implementation, the transmitting module 23 can be further configured to stop transmission of the location information and driving information of the vehicle where the second vehicle-mounted server is located to the vehicle-mounted server corresponding to the vehicle-mounted server identifier carried in the platooning request, other than the vehicle-mounted server identifier corresponding to the first vehicle-mounted server.

Further, in a possible implementation, the receiving module 21 can be further configured to stop reception of the distance reported by the vehicle-mounted server corresponding to the vehicle-mounted server identifier carried in the platooning request, other than the vehicle-mounted server identifier corresponding to the first vehicle-mounted server.

Based on the same inventive concept, the embodiments of the present disclosure provide the following device and medium.

Embodiment 6

Figure 6:
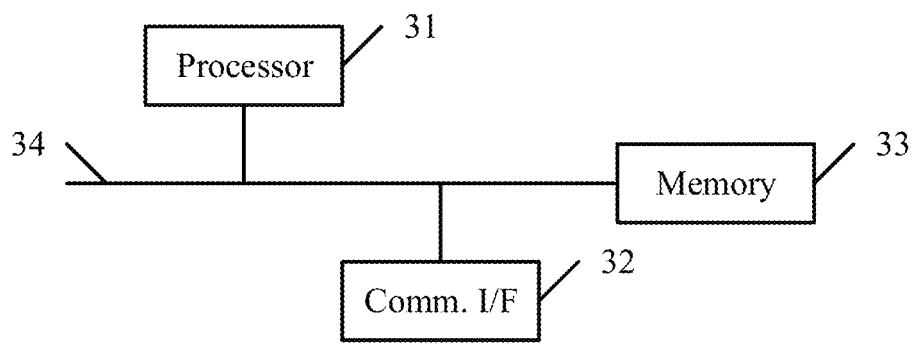
FIG. 6 is a schematic diagram showing a structure of a device for vehicle automatic navigation control according to Embodiment 6 of the present disclosure.

Embodiment 6 of the present disclosure provides a device for vehicle automatic navigation control. The device may have a structure as shown in FIG. 6, including a processor 31, a communication interface 32, a memory 33, and a communication bus 34. The processor 31, the communication interface 32, and the memory 33 communicate with each other via the communication bus 34.

The memory 33 is configured to store a computer program.

The processor 31 is configured to implement, when executing the program stored on the memory, the method according to Embodiment 1 of the present disclosure.

Embodiment 7 of the present disclosure provides a device for vehicle automatic navigation control. The device may also have a structure as shown in FIG. 6, including a processor 31, a communication interface 32, a memory 33, and a communication bus 34. The processor 31, the communication interface 32, and the memory 33 communicate with each other via the communication bus 34.

The memory 33 is configured to store a computer program.

The processor 31 is configured to implement, when executing the program stored on the memory, the method according to Embodiment 2 of the present disclosure.

Optionally, the processor 31 may specifically include a Central Processing Unit (CPU), an Application Specific Integrated Circuit (ASIC), one or more integrated circuits for controlling program execution, a hardware circuit developed by Field Programmable Gate Array (FPGA), or a baseband processor.

Optionally, the processor 31 may include at least one processing core.

Optionally, the memory 33 may include a Read-Only Memory (ROM), a Random Access Memory (RAM), and a disk memory. The memory 33 is configured to store data required by the at least one processor 31 during operation. The number of memories 33 may be one or more.

Embodiment 8 of the present disclosure provides a non-volatile computer storage medium storing an executable program which, when executed by a processor, implements the method according to Embodiment 1 of the present disclosure.

Embodiment 9 of the present disclosure provides a non-volatile computer storage medium storing an executable program which, when executed by a processor, implements the method according to Embodiment 2 of the present disclosure.

In a specific implementation process, the computer storage medium may include: a Universal Serial Bus (USB) Flash Drive, a mobile hard disk, a Read-Only Memory (ROM), a Random Access Memory (RAM), a magnetic disk, an optical disc, or other storage medium capable of storing program codes.

In the embodiments of the present disclosure, it can be appreciated that the disclosed devices and methods may be implemented in other ways. For example, the device embodiments described above are illustrative only. For example, the units or divisions thereof are only divisions based on logical functions. There may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical or in any other forms.

The functional units in the embodiments of the present disclosure may be integrated into one processing unit, or alternatively be separate physical modules.

When the integrated unit is implemented in the form of a software functional unit and sold or used as a standalone product, it can be stored in a computer readable storage medium. Based on this understanding, all or part of the technical solutions according to the embodiments of the present disclosure can be embodied in the form of a software product. The computer software product may be stored in a storage medium and contain instructions to enable a computer device, such as a personal computer, a server, or a network device, etc., or a processor to perform all or part of the steps of the method described in each of the embodiments of the present disclosure. The storage medium may include a Universal Serial Bus Flash Drive, a mobile hard disk, a ROM, a RAM, a magnetic disk, an optical disc, or any other medium capable of storing program codes.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage, CD-ROM, and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the preferred embodiments of the present disclosure have described above, further alternatives and modifications can be made to these embodiments by those skilled in the art in light of the basic inventive concept of the present disclosure. The claims as attached are intended to cover the preferred embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for vehicle automatic navigation control, comprising:
   receiving, by a first vehicle-mounted server, at least one piece of automatic navigation information each containing a navigation route, a destination, a current location, and a vehicle-mounted server identifier of a corresponding vehicle;
   determining, based on automatic navigation information corresponding to a vehicle where the first vehicle-mounted server is located and the at least one piece of automatic navigation information, a first vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement;
   transmitting a platooning request to a second vehicle-mounted server corresponding to the determined first vehicle-mounted server identifier of the vehicle to form the platoon, the platooning request carrying the first vehicle-mounted server identifier corresponding to the first vehicle-mounted server;
   receiving a platooning response containing location information and driving information, the location information and the driving information being fed back from the second vehicle-mounted server receiving the platooning request based on the first vehicle-mounted server identifier carried in the platooning request in accordance with a predetermined time length, the driving information containing steering wheel angle information, throttle control amount information, and brake control amount information; and
   controlling, in accordance with the platooning response received each time, the vehicle where the first vehicle-mounted server is located to move as a following vehicle of the vehicle where the second vehicle-mounted server is located,
   wherein the vehicle where the first vehicle-mounted server is located has one or more following vehicles, or the vehicle where the second vehicle-mounted server is located has one or more following vehicles,
   wherein the navigation route corresponding to the first vehicle-mounted server and a navigation route corresponding to the second vehicle-mounted server receiving the platooning request have an overlapping navigation route, wherein the current location is located before a starting point of the overlapping navigation route, and wherein a distance between the current location and the starting point of the overlapping navigation route is not greater than a first threshold.

2. The method of claim 1, further comprising, subsequent to determining the first vehicle-mounted server identifier of the vehicle to form the platoon with the vehicle where the first vehicle-mounted server is located, and prior to transmitting the platooning request to the second vehicle-mounted server corresponding to the determined first vehicle-mounted server identifier of the vehicle to form the platoon:
   determining whether the vehicle where the first vehicle-mounted server is located has the one or more following vehicles; and
   transmitting, when it is determined that the vehicle where the first vehicle-mounted server is located has the one or more following vehicles, the platooning request to the second vehicle-mounted server corresponding to the determined first vehicle-mounted server identifier of the vehicle to form the platoon, the platooning request further carrying one or more vehicle-mounted server identifiers corresponding to the one or more following vehicles of the vehicle where the first vehicle-mounted server is located, the one or more vehicle-mounted server identifiers corresponding to the one or more following vehicles of the vehicle where the first vehicle-mounted server is located corresponding to an order in which the one or more following vehicles follow the vehicle where the first vehicle-mounted server is located,
   wherein the method further comprises, subsequent to receiving the platooning response containing the location information and the driving information:

stopping transmission of the location information and the driving information to one or more vehicle-mounted servers corresponding to the one or more following vehicles of the vehicle where the first vehicle-mounted server is located, such that the one or more vehicle-mounted servers corresponding to the one or more following vehicles of the vehicle where the first vehicle-mounted server is located control the vehicle where the vehicle-mounted server is located to move as the following vehicle of the vehicle where the second vehicle-mounted server is located in accordance with the received platooning response containing the location information and the driving information.

3. The method of claim 2, further comprising, subsequent to receiving the platooning response containing the location information and the driving information:
transmitting a second vehicle-mounted server identifier of the second vehicle-mounted server to the one or more vehicle-mounted servers corresponding to the one or more following vehicles of the vehicle where the first vehicle-mounted server is located, to instruct each of the one or more vehicle-mounted servers corresponding to the one or more following vehicles to report a distance to the second vehicle-mounted server, the distance being a distance, determined by the vehicle-mounted server corresponding to that following vehicle each time it receives location information in accordance with a specified time length, between a location corresponding to the received location information and its corresponding location,
wherein the location information received by the vehicle-mounted server corresponding to one of the one or more following vehicles of the vehicle where the first vehicle-mounted server is located in accordance with the specified time length is location information corresponding to a vehicle in front of the corresponding following vehicle.

4. The method of claim 1, further comprising, subsequent to transmitting the platooning request to the second vehicle-mounted server corresponding to the determined first vehicle-mounted server identifier of the vehicle to form the platoon, and prior to receiving the platooning response containing the location information and the driving information:
receiving, by the first vehicle-mounted server, a prompt message in accordance with a specific time length, the prompt message carrying the location information and speed information; and
controlling, each time the prompt message is received, the vehicle where the first vehicle-mounted server is located to approach a location corresponding to the location information carried in the prompt message, controlling, when a distance between the vehicle where the first vehicle-mounted server is located and the location corresponding to the location information carried in the received prompt message is not greater than a second threshold, a difference between a speed of the vehicle where the first vehicle-mounted server is located and a speed corresponding to the speed information carried in the prompt message not to be greater than a third threshold, and transmitting a confirmation message to the second vehicle-mounted server.

5. The method of claim 1, further comprising:
transmitting, when the first vehicle-mounted server determines that its corresponding location is a specified location in the overlapping navigation route, a request to quit the platoon to the second vehicle-mounted server receiving the platooning request, and determining a navigation target location based on its corresponding navigation route.

6. The method of claim 5, further comprising, subsequent to transmitting the request to quit the platoon to the second vehicle-mounted server receiving the platooning request, when transmission of the location information and the driving information to the vehicle-mounted server corresponding to each of the one or more following vehicles of the vehicle where the first vehicle-mounted server is located has been stopped:
resuming transmission of the location information and the driving information to one or more vehicle-mounted servers corresponding to the one or more following vehicles of the vehicle where the first vehicle-mounted server is located, such that the vehicle-mounted server corresponding to that following vehicle controls that following vehicle to move as a following vehicle of the vehicle where the first vehicle-mounted server is located in accordance with the location information and the driving information.

7. The method of claim 5, further comprising, subsequent to transmitting the request to quit the platoon to the second vehicle-mounted server receiving the platooning request, when a second vehicle-mounted server identifier of the second vehicle-mounted server has been transmitted to one or more vehicle-mounted servers corresponding to the one or more following vehicles of the vehicle where the first vehicle-mounted server is located:
transmitting the first vehicle-mounted server identifier of the first vehicle-mounted server to the one or more vehicle-mounted servers corresponding to the one or more following vehicles of the vehicle where the first vehicle-mounted server is located, to instruct the vehicle-mounted server corresponding to that following vehicle to report a distance to the first vehicle-mounted server, the distance being a distance, determined by the vehicle-mounted server corresponding to that following vehicle each time it receives location information in accordance with a specified time length, between a location corresponding to the received location information and its corresponding location.

8. The method of claim 1, further comprising, when the destination corresponding to the first vehicle-mounted server is same as a destination corresponding to the second vehicle-mounted server receiving the platooning request:
transmitting, when the first vehicle-mounted server determines that its corresponding location is its corresponding destination, a request to quit the platoon to the second vehicle-mounted server receiving the platooning request.

9. A non-transitory computer storage medium, storing an executable program which, when executed by a processor, implements a method for vehicle automatic navigation control, the method comprising:
receiving, by a first vehicle-mounted server, at least one piece of automatic navigation information each containing a navigation route, a destination, a current location, and a vehicle-mounted server identifier of a corresponding vehicle;
determining, based on automatic navigation information corresponding to a vehicle where the first vehicle-mounted server is located and the at least one piece of automatic navigation information, a first vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement;

transmitting a platooning request to a second vehicle-mounted server corresponding to the determined first vehicle-mounted server identifier of the vehicle to form the platoon, the platooning request carrying the first vehicle-mounted server identifier corresponding to the first vehicle-mounted server;

receiving a platooning response containing location information and driving information, the location information and the driving information being fed back from the second vehicle-mounted server receiving the platooning request based on the first vehicle-mounted server identifier carried in the platooning request in accordance with a predetermined time length, the driving information containing steering wheel angle information, throttle control amount information, and brake control amount information; and controlling, in accordance with the platooning response received each time, the vehicle where the first vehicle-mounted server is located to move as a following vehicle of the vehicle where the second vehicle-mounted server is located, wherein the vehicle where the first vehicle-mounted server is located has one or more following vehicles, or the vehicle where the second vehicle-mounted server is located has one or more following vehicles, wherein the navigation route corresponding to the first vehicle-mounted server and a navigation route corresponding to the second vehicle-mounted server receiving the platooning request have an overlapping navigation route, wherein the current location is located before a starting point of the overlapping navigation route, and wherein a distance between the current location and the starting point of the overlapping navigation route is not greater than a first threshold.

10. The non-transitory computer storage medium of claim 9, wherein the method further comprises, subsequent to determining the first vehicle-mounted server identifier of the vehicle to form the platoon with the vehicle where the first vehicle-mounted server is located, and prior to transmitting the platooning request to the second vehicle-mounted server corresponding to the determined first vehicle-mounted server identifier of the vehicle to form the platoon:

determining whether the vehicle where the first vehicle-mounted server is located has the one or more following vehicles; and transmitting, when it is determined that the vehicle where the first vehicle-mounted server is located has the one or more following vehicles, the platooning request to the second vehicle-mounted server corresponding to the determined first vehicle-mounted server identifier of the vehicle to form the platoon, the platooning request further carrying one or more vehicle-mounted server identifiers corresponding to the one or more following vehicles of the vehicle where the first vehicle-mounted server is located, the one or more vehicle-mounted server identifiers corresponding to the one or more following vehicles of the vehicle where the first vehicle-mounted server is located corresponding to an order in which the one or more following vehicles follow the vehicle where the first vehicle-mounted server is located, wherein the method further comprises, subsequent to receiving the platooning response containing the location information and the driving information:

stopping transmission of the location information and the driving information to one or more vehicle-mounted servers corresponding to the one or more following vehicles of the vehicle where the first vehicle-mounted server is located, such that the one or more vehicle-mounted servers corresponding to the one or more following vehicles of the vehicle where the first vehicle-mounted server is located control the vehicle where the vehicle-mounted server is located to move as the following vehicle of the vehicle where the second vehicle-mounted server is located in accordance with the received platooning response containing the location information and the driving information.

11. The non-transitory computer storage medium of claim 10, wherein the method further comprises, subsequent to receiving the platooning response containing the location information and the driving information:

transmitting a second vehicle-mounted server identifier of the second vehicle-mounted server to the one or more vehicle-mounted servers corresponding to the one or more following vehicles of the vehicle where the first vehicle-mounted server is located, to instruct each of the one or more vehicle-mounted servers corresponding to the one or more following vehicles to report a distance to the second vehicle-mounted server, the distance being a distance, determined by the vehicle-mounted server corresponding to that following vehicle each time it receives location information in accordance with a specified time length, between a location corresponding to the received location information and its corresponding location, wherein the location information received by the vehicle-mounted server corresponding to one of the one or more following vehicles of the vehicle where the first vehicle-mounted server is located in accordance with the specified time length is location information corresponding to a vehicle in front of the corresponding following vehicle.

12. The non-transitory computer storage medium of claim 9, wherein the method further comprises, subsequent to transmitting the platooning request to the second vehicle-mounted server corresponding to the determined first vehicle-mounted server identifier of the vehicle to form the platoon, and prior to receiving the platooning response containing the location information and the driving information:

receiving, by the first vehicle-mounted server, a prompt message in accordance with a specific time length, the prompt message carrying the location information and speed information; and controlling, each time the prompt message is received, the vehicle where the first vehicle-mounted server is located to approach a location corresponding to the location information carried in the prompt message, controlling, when a distance between the vehicle where the first vehicle-mounted server is located and the location corresponding to the location information carried in the received prompt message is not greater than a second threshold, a difference between a speed of the vehicle where the first vehicle-mounted server is located and a speed corresponding to the speed information carried in the prompt message not to be greater than a third threshold, and transmitting a confirmation message to the second vehicle-mounted server.

13. The non-transitory computer storage medium of claim 9, wherein the method further comprises:
- transmitting, when the first vehicle-mounted server determines that its corresponding location is a specified location in the overlapping navigation route, a request to quit the platoon to the second vehicle-mounted server receiving the platooning request, and
- determining a navigation target location based on its corresponding navigation route.

14. A device for vehicle automatic navigation control, comprising a processor, a communication interface, a memory, and a communication bus, wherein the processor, the communication interface, and the memory communicate with each other via the communication bus,
- the memory is configured to store a computer program, and
- the processor is configured to implement, when executing the program stored on the memory, a method, wherein the method comprises:
  - receiving, by a first vehicle-mounted server, at least one piece of automatic navigation information each containing a navigation route, a destination, a current location, and a vehicle-mounted server identifier of a corresponding vehicle;
  - determining, based on automatic navigation information corresponding to a vehicle where the first vehicle-mounted server is located and the at least one piece of automatic navigation information, a first vehicle-mounted server identifier of a vehicle to form a platoon with the vehicle where the first vehicle-mounted server is located, an information overlapping degree between automatic navigation information of the vehicle to form the platoon and the automatic navigation information corresponding to the vehicle where the first vehicle-mounted server is located meeting a predefined requirement;
  - transmitting a platooning request to a second vehicle-mounted server corresponding to the determined first vehicle-mounted server identifier of the vehicle to form the platoon, the platooning request carrying the first vehicle-mounted server identifier corresponding to the first vehicle-mounted server;
  - receiving a platooning response containing location information and driving information, the location information and the driving information being fed back from the second vehicle-mounted server receiving the platooning request based on the first vehicle-mounted server identifier carried in the platooning request in accordance with a predetermined time length, the driving information containing steering wheel angle information, throttle control amount information, and brake control amount information; and
  - controlling, in accordance with the platooning response received each time, the vehicle where the first vehicle-mounted server is located to move as a following vehicle of the vehicle where the second vehicle-mounted server is located,
  - wherein the vehicle where the first vehicle-mounted server is located has one or more following vehicles, or the vehicle where the second vehicle-mounted server is located has one or more following vehicles,
  - wherein the navigation route corresponding to the first vehicle-mounted server and a navigation route corresponding to the second vehicle-mounted server receiving the platooning request have an overlapping navigation route, wherein the current location is located before a starting point of the overlapping navigation route, and wherein a distance between the current location and the starting point of the overlapping navigation route is not greater than a first threshold.

15. The device of claim 14, wherein the method further comprises, subsequent to determining the first vehicle-mounted server identifier of the vehicle to form the platoon with the vehicle where the first vehicle-mounted server is located, and prior to transmitting the platooning request to the second vehicle-mounted server corresponding to the determined first vehicle-mounted server identifier of the vehicle to form the platoon:
- determining whether the vehicle where the first vehicle-mounted server is located has the one or more following vehicles; and
- transmitting, when it is determined that the vehicle where the first vehicle-mounted server is located has the one or more following vehicles, the platooning request to the second vehicle-mounted server corresponding to the determined first vehicle-mounted server identifier of the vehicle to form the platoon, the platooning request further carrying one or more vehicle-mounted server identifiers corresponding to the one or more following vehicles of the vehicle where the first vehicle-mounted server is located, the one or more vehicle-mounted server identifiers corresponding to the one or more following vehicles of the vehicle where the first vehicle-mounted server is located corresponding to an order in which the one or more following vehicles follow the vehicle where the first vehicle-mounted server is located,
- wherein the method further comprises, subsequent to receiving the platooning response containing the location information and the driving information:
- stopping transmission of the location information and the driving information to one or more vehicle-mounted servers corresponding to the one or more following vehicles of the vehicle where the first vehicle-mounted server is located, such that the one or more vehicle-mounted servers corresponding to the one or more following vehicles of the vehicle where the first vehicle-mounted server is located control the vehicle where the vehicle-mounted server is located to move as the following vehicle of the vehicle where the second vehicle-mounted server is located in accordance with the received platooning response containing the location information and the driving information.

16. The device of claim 14, wherein the method further comprises, when the destination corresponding to the first vehicle-mounted server is same as a destination corresponding to the second vehicle-mounted server receiving the platooning request:
- transmitting, when the first vehicle-mounted server determines that its corresponding location is its corresponding destination, a request to quit the platoon to the second vehicle-mounted server receiving the platooning request.

17. The device of claim 16, wherein the method further comprises, subsequent to transmitting the request to quit the platoon to the second vehicle-mounted server receiving the platooning request, when transmission of the location information and the driving information to the vehicle-mounted server corresponding to each of the one or more following vehicles of the vehicle where the first vehicle-mounted server is located has been stopped:
- resuming transmission of the location information and the driving information to one or more vehicle-mounted servers corresponding to the one or more following vehicles of the vehicle where the first vehicle-mounted server is located, such that the vehicle-mounted server corresponding to that following vehicle controls that following vehicle to move as a following vehicle of the vehicle where the first vehicle-mounted server is located in accordance with the location information and the driving information.

18. The device of claim 16, wherein the method further comprises, subsequent to transmitting the request to quit the platoon to the second vehicle-mounted server receiving the platooning request, when a second vehicle-mounted server identifier of the second vehicle-mounted server has been transmitted to one or more vehicle-mounted servers corresponding to the one or more following vehicles of the vehicle where the first vehicle-mounted server is located:

transmitting the first vehicle-mounted server identifier of the first vehicle-mounted server to the one or more vehicle-mounted servers corresponding to the one or more following vehicles of the vehicle where the first vehicle-mounted server is located, to instruct the vehicle-mounted server corresponding to that following vehicle to report a distance to the first vehicle-mounted server, the distance being a distance, determined by the vehicle-mounted server corresponding to that following vehicle each time it receives location information in accordance with a specified time length, between a location corresponding to the received location information and its corresponding location.

* * * * *